United States Patent [19]
Onksen et al.

[11] 4,360,888
[45] Nov. 23, 1982

[54] OMNIDIRECTIONAL AIRSPEED SYSTEM

[75] Inventors: Peter J. Onksen, Merrimack, N.H.; Robert G. Hundley, deceased, late of Burlington, Mass.; Francine Hundley, heiress, Duxbury, Mass.

[73] Assignee: Pacer Systems, Inc., Burlington, Mass.

[21] Appl. No.: 150,118

[22] Filed: May 15, 1980

[51] Int. Cl.³ .................. G01C 21/10; G06F 15/20
[52] U.S. Cl. .................. 364/565; 73/178 R; 73/182; 364/440
[58] Field of Search ........... 364/565, 815; 73/178 R, 73/178 H, 181, 182

[56] References Cited
U.S. PATENT DOCUMENTS

| | | | |
|---|---|---|---|
| 3,332,282 | 7/1967 | Daw | 73/182 |
| 3,400,584 | 9/1968 | Beilman | 73/182 |
| 3,584,783 | 6/1971 | Kobori | 364/815 |
| 3,726,139 | 4/1973 | Beilman | 73/181 |
| 4,065,957 | 1/1978 | Beilman | 73/182 |
| 4,074,570 | 2/1978 | Beilman et al. | 73/178 R X |
| 4,163,387 | 8/1979 | Schroeder | 73/178 R |
| 4,181,962 | 1/1980 | West, Jr. et al. | 364/565 |

*Primary Examiner*—Felix D. Gruber
*Attorney, Agent, or Firm*—James C. Wray

[57] ABSTRACT

A microprocessor receives sensor signals and produces signals proportional to total, longitudinal and lateral air speed. An omnidirectional air speed sensor uses pressure samplers on a rotating arm to produce a sinusoidal pressure differential signal related to air speed. An interrupter disc rotating with the arm periodically exposes an opto-electric sensor to light to produce a pulse phase reference signal. In one embodiment, the pulse signal operates a first ramp generator to produce an arm RPM signal and operates a second ramp generator in conjunction with the sinusoidal signal to produce an azimuth reference signal. The RPM and azimuth signals are fed to a processor to resolve the air speed into longitudinal and lateral components. In the preferred embodiment, the processor receives the pulse signal and produces a pair of out-of-phase square wave signals which control chopper modulators which demodulate the sinusoidal signal to produce signals proportional to lateral and longitudinal speed.

20 Claims, 3 Drawing Figures

OMNIDIRECTIONAL AIRSPEED SYSTEM

BACKGROUND OF THE INVENTION

The present invention relates to omnidirectional air speed systems primarily systems intended for use in rotary wing and vertical take off and landing type aircraft in which accurate low range speed measurements are critical.

The precise measurement of low range air speeds has historically presented problems. The problems are compounded when it is necessary to know longitudinal and lateral components of air speed as well as total speed. It is known that air pressure and temperature and density affect the accuracy of air speed measurements.

SUMMARY OF THE INVENTION

The omnidirectional air speed system of the present invention uses inputs of a sinusoidal signal of pressure differential between pressure samples at opposite ends of a rotating arm and an electric sensor cooperating with an interrupter disc as well as signals representative of ambient pressure and temperature. The interrupter provides a pulse signal which provides a time-related signal and, when compared with the sinusoidal signal, a delta time signal. The time, delta time, pressure differential, and ambient pressure and temperature signals are supplied to a processor, which uses the inputs to provide outputs of delta time compared to time—phase angle, actual time compared to computed time—gain, lateral speed, longitudinal speed and total speed, pressure altitude and density altitude and limits of lateral speed and longitudinal speed in the forward and rearward directions. In the preferred embodiment, the pulse signal produces zero and ninety degree phase shifted demodulator signals which control first and second chopper demodulators which are supplied with the gain-controlled filtered pressure differential total air speed signal. The output from the first chopper demodulator is a signal of lateral speed, and the output from the second chopper demodulator is a signal of longitudinal speed. The signals of total lateral and longitudinal speeds are converted to DC and are fed to the processor via the multiplexer with ambient pressure and temperature voltages.

The above and other objects and features of the invention are apparent in the disclosure, which includes the foregoing and ongoing specification, which includes the claims and the drawings.

DETAILED DESCRIPTION OF THE INVENTION

Figure 1:
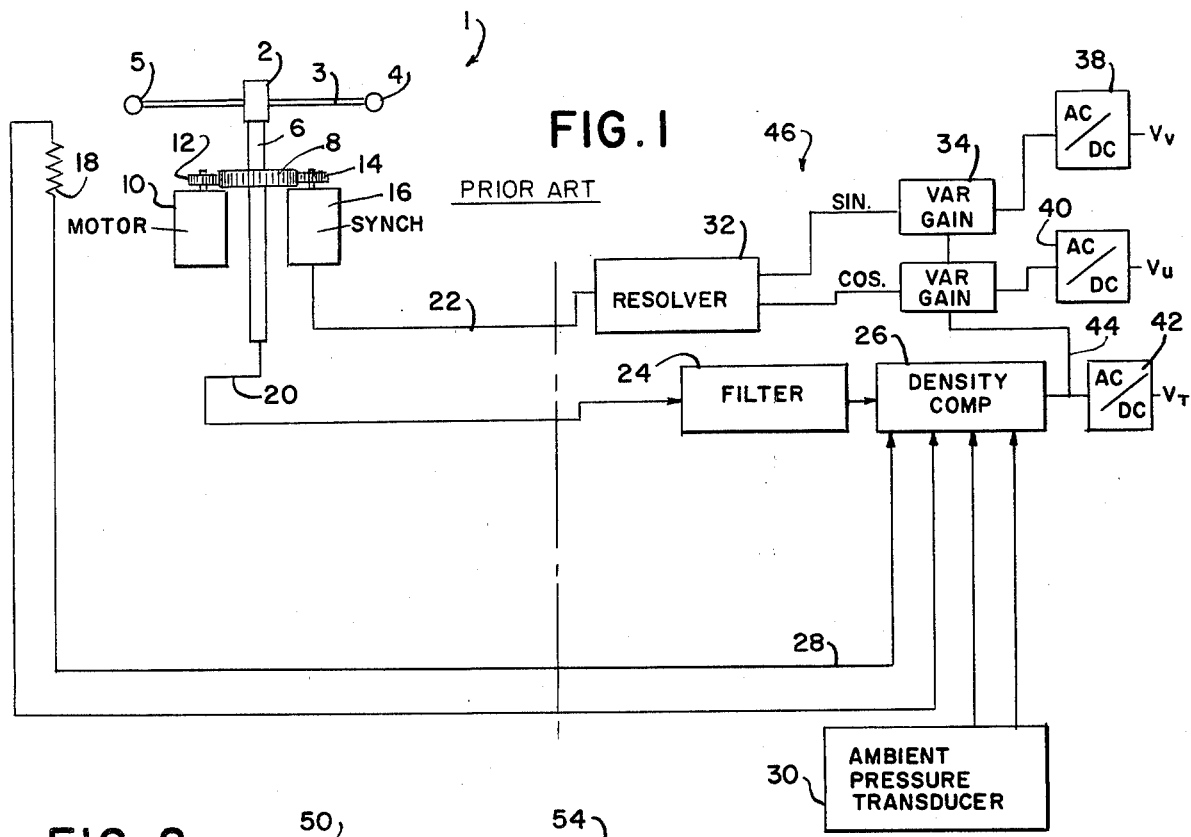
FIG. 1 shows an existing omnidirectional airspeed system.

The system is mounted on a helicopter and has a main body topped by a pair of symmetrical arms, at the end of which are venturi-like shrouds. The arms are connected to a central hub and are rotated by a motor at the base of the device. Air speed is measured as a differential pressure between the two rotating venturi-like sensors which are mounted at the ends of the hollow tube arms. When a zero air speed condition exists, the resultant pressures in the hollow arms are equal and are due only to the velocity of the air through each venturi-like sensor resulting from the tip speed of the arm. With the same pressure in each hollow tube, a differential pressure transducer at the center of the tube has zero outputs. At air speeds other than zero, the velocity of the air through the sensors varies sinusoidally, with maximum difference occurring when the sensor arms are aligned perpendicular to the wind. At that instant the velocity of the sensor advancing into the wind is equal to the tip speed plus the air speed, and the velocity of the wind in the sensor retreating from the wind is equal to the tip speed minus the air speed. The resultant pressures in the two hollow tubes are then different, and the transducer outputs a voltage proportional to the differential pressure and proportional to the total speed.

At the instant the arms are aligned parallel to the wind, the wind velocity in the sensors are again equal and the differential pressure transducer outputs zero. The resultant wave form of voltages from the differential transducer is a sinusoid, with amplitude related to air speed and phase related to relative direction of the wind.

In the present invention the phase reference used to resolve the airspeed signal into the longitudinal and lateral components is an optoelectric sensor and an interrupter disc. The interrupter disc is mounted on the drive shaft and rotates with the arms. Once per revolution of the arms an electrical pulse is output from the optoelectrical sensor. This reference pulse is phase locked to the arm position during alignment and calibration of the omnidirectional airspeed sensor using a "0" (zero) reference scribe line on the sensor body. When the zero reference is aligned to the helicopter longitudinal axis the air data will then be aligned.

The temperature sensor is an active electronic device and is mounted on the airspeed sensor mast. Since the probe is mounted to the rear of the body, the mounting provides for the best available protection of the probe from impact air, dust, sand, rain or ice. Since the temperature probe is mounted above the main rotor hub, it is free of impact due to high downwash velocities of the main rotor and mishandling which might occur on a lower fuselage location. The temperature sensor is isolated from the body by insulator material. The probe is well displaced from the anti-ice heating elements on the ends of the sensor arms as well.

The air data processor ADP receives inputs from the sensor, processes this sensor data to obtain the desired components of air data, and outputs the air data.

The principal elements of the ADP consist of:

Input/Output Module—which converts the AC sensor signals to DC analog and multiplex signals into the processor module. The analog output shape/hold circuits are on the input/output module. An A/D converter converts the multiplexed analog signals into digital signals input to a microprocessor which computes the air data values and converts the digital air data values into analog format for output via the sample/hold circuits on the input/output module.

Power supply is a DC/DC converter which provides ±15 V and +5 V operating power.

The processor receives the differential pressure signal, the phase reference signal and temperature signals from the airspeed sensor. The differential pressure signal is band pass filtered to remove spurious noise components, amplified and converted into a DC signal in an absolute value circuit. This signal is input to the processor via a system channel multiplexer. This differential pressure signal is the measured total airspeed signal.

The phase reference signal, a 12 Hertz 5 Volt pulse, is input to two ramp generators which develop two voltage levels. One voltage line is the RPM of the sensor arms and the other, when ratioed with the RPM signal, is the measured Beta signal. The RPM ramp generator is set to zero volts by a 5 volt pulse and starts to develop a ramp voltage. The next 5 volt pulse stops the ramp generator and the resultant voltage is an indication of the RPM of the sensor arms.

The azimuth reference ramp generator is set to zero and a ramp voltage is generated until the output of a zero crossing detection on the differential pressure transducer signal stops the ramp generator and the resultant voltage relates to the measured Beta of the airspeed signal (differential pressure signal). The RPM and aximuth reference signals are input to the processor via the multiplexer.

The temperature signal and the ambient pressure signal are buffered on the input/output module and input to the processor via the multiplexer.

The power supply consists of a Power Cube ™ power supply module, a printed circuit board with reverse polarity and overvoltage protection circuits. Both are mounted in an EMI enclosure to attenuate the frequency of the power supply module.

A static pressure transducer provides a measurement of ambient pressure for input to the processor.

The processor has input multiplexed analog signals from the input/output module and digital inputs from octal thumb wheels (bore sight switches). The processor is based on the Motorola 6800 microprocessor with 6 K bytes of ROM and 256 Bytes of RAM. The refresh rate of the processor is 20 Hertz. The analog processed sensor data is input to the processor via a system channel multiplexer under control. The analog signals are digitized using a digital to analog converter, a comparator and an analog to digital software subroutine.

The following are a list of the equations and logic used to compute the various air data from the processed sensor data.

3—Differential pressure signal DC offset out of limit.

Airdata processor Discreet—Fail Logic
1—If sum check of ROM does not match pre-set value. This check is done on start up each time the reset pulse is activated (when power is first applied to computer module).
2—If $V_T = V_v^2 + V_u^2$
3—If the voltage levels on sample/hold circuits do not match the stored digital values of the Air Data Signals.
4—If the pressure signal is less than 5 psi or greater than 16.9 psi.
5—If one of the following signals reaches or exceeds the output voltage limits (+10 VDC)
$V_v$
$V_u$
$V_T$
ADR $V_{ZT}$ Discreet—Valid Logic
1—$V_v$ is greater than ±40 knots
2—$V_u$ is less than ±50 knots
3—Beta is less than ±25°

The omnidirectional air speed system has a mast, a shaft mounted for rotation within the mast and an arm connected to the shaft and extending radially therefrom for rotating with the shaft. A motor rotates the shaft and pressure samplers on opposite ends of the shaft. A pressure differential sensor is connected to the pressure samplers for producing a signal related to differential pressure. A disc mounted on the shaft has at least one irregularity. An irregularity sensor is mounted adjacent the disc for sensing the irregularity. Means connected to the irregularity sensor and to the pressure differential sensor produce indications of speed vectors and sums.

Preferably the irregularity in the disc comprises an opening in the disc and the irregularity sensor projects a beam through the opening and receives a beam through the opening. In a preferred embodiment the beam is a light beam and a photocell receives the beam. A pulse transmitter connected to the photocell transmits a pulse upon the photocell receiving the beam.

Preferably the omnidirectional air speed system of the invention has first and second ramp generators con- $$\text{Air Density Ratio} = \frac{T \text{ ambient (absolute)}}{T \text{ standard (absolute)}} \times \frac{P \text{ standard}}{P \text{ ambient}}$$

$$\text{Side Slip Angle} = \frac{\text{Azimuth reference value}}{\text{RPM value}} - \text{function of } V_T^1 + \text{function of } \frac{A_Z \text{ ref val}}{\text{RPM value}} + \text{Bore Sight switch setting}.$$

Measured Airspeed - Absolute value of differential pressure transducer signal ($V_T^1$)

$V_v$ (Longitudinal Airspeed) -

$$\left[ \left( V_T^1 \times \frac{1}{ADR} \times \frac{RPM}{RPM \text{ nominal}} \times \text{function of } \frac{A_Z \text{ Ref value}}{RPM} \right) + \text{function of } V_T^1 \right] \times \text{COS angle of side slip}$$

$V_u$ (Lateral Airspeed) -

$$\left[ \left( V_T^1 \times \frac{1}{ADR} \times \frac{RPM}{RPM \text{ nominal}} \times \text{function of } \frac{A_Z \text{ Ref value}}{RPM} \right) + \text{function of } V_T^1 \right] \text{SIN angle of side slip}$$

Beta - Angle of side slip

The following is the BIT logic for the four discreet logic outputs of the Computer Module.
Omnidirectional airspeed sensor Discreet—Fail Logic
1—RPM value too low or too high
2—Temperature value too low or too high nected to the pulse transmitter. The first ramp generator produces uniform ramps between occurrences of pulses. A filter filters a signal from the pressure differential sensor. The second ramp generator is connected to the filter and produces a signal related to timing of the pulse and timing of the filter signal. An AC to DC converter receives the filtered signal and converts it to a DC signal. A multiplexer connects to the first ramp generator for receiving a time signal, connects to the second ramp generator for receiving a time differential signal and connects to the AC to DC converter for receiving a magnitude signal. An analog to digital converter connected to the multiplexer converts analog signals from the multiplexer to digital signals. A microprocessor connected to the analog to digital converter processes signals from the multiplexer, and an output connected to the microprocessor means gives indications of lateral, longitudinal and total speed. Preferably, the output has a digital to analog converter with outputs of speed vectors and sum and outputs of pressure altitude and density altitude. The microprocessor further has outputs of delta time/time, which equals phase angle, and actual time versus constant time which equals gain. The microprocessor further generates output signals corresponding to limits of speeds in the forward, reverse and lateral directions. In the preferred embodiment, the pulse transmitter is connected to a processor which includes correction means and timer means to produce from the pulses signals at zero degree and ninety degree intervals. The processor has a gain output, and a gain control is connected to the filter for operating on the filtered signal according to the gain signal to produce a gain-controlled filtered signal. The gain-controlled filter signal is fed to first and second chopper demodulators. The first chopper demodulator produces a signal related to lateral velocity. The second chopper demodulator receives the ninety degree signal and produces a signal related to longitudinal velocity. An AC to DC converter is connected to the gain control and to the first and second chopper demodulator for inputting gain-controlled signals and demodulated signals of lateral velocity and longitudinal velocity to a multiplexer.

Referring to FIG. 1, an existing omnidirectional air speed sensor is generally referred to by the numeral 1.

Sensor 1 has a head 2 in which is mounted a pressure differential sensor. An arm 3 made of hollow tubes extends in opposite directions from head 2 and terminates in shrouds 4 and 5 which contain pressure sampling openings leading into the hollow tubes of arm 3. Shaft 6, which is driven by gear 8, rotates head 2 and arm 3. Motor 10 drives pinion 12 which, in turn, drives gear 8 and shaft 6. Pinion 14 drives synchronizer 16. The outputs of the sensor are the pressure differential signal which is sinusoidal on connector 20 and the synchronizer signal on line 22, which is related to the angular position and rotation of shaft 6.

The pressure differential signal is fed to band pass filter 24 to remove noise. The filtered signal is fed to density compensator 26, which receives a DC temperature signal on line 28 from temperature sensor 18 and a DC ambient pressure signal from ambient pressure transducer 30.

The synchronizer signal on line 22 is fed to resolver 32 which separates the signal into sine and cosine components.

The sine and cosine components are multiplied by the filtered air density compensated pressure differential signal in variable gain amplifiers 34, and the resulting signals are converted to DC signals.

As shown in FIG. 1, converter 38 outputs the $V_V$ signal which has a magnitude related to the longitudinal component of air speed. Converter 40 outputs a $V_u$ signal which has a magnitude related to the lateral component of air speed. Converter 42 converts the AC filtered density compensated pressure differential signal to a signal of total air speed $V_t$. The same filtered density compensated signal is provided on line 44 to the variable gain amplifiers 34, as previously stated.

Figure 3:
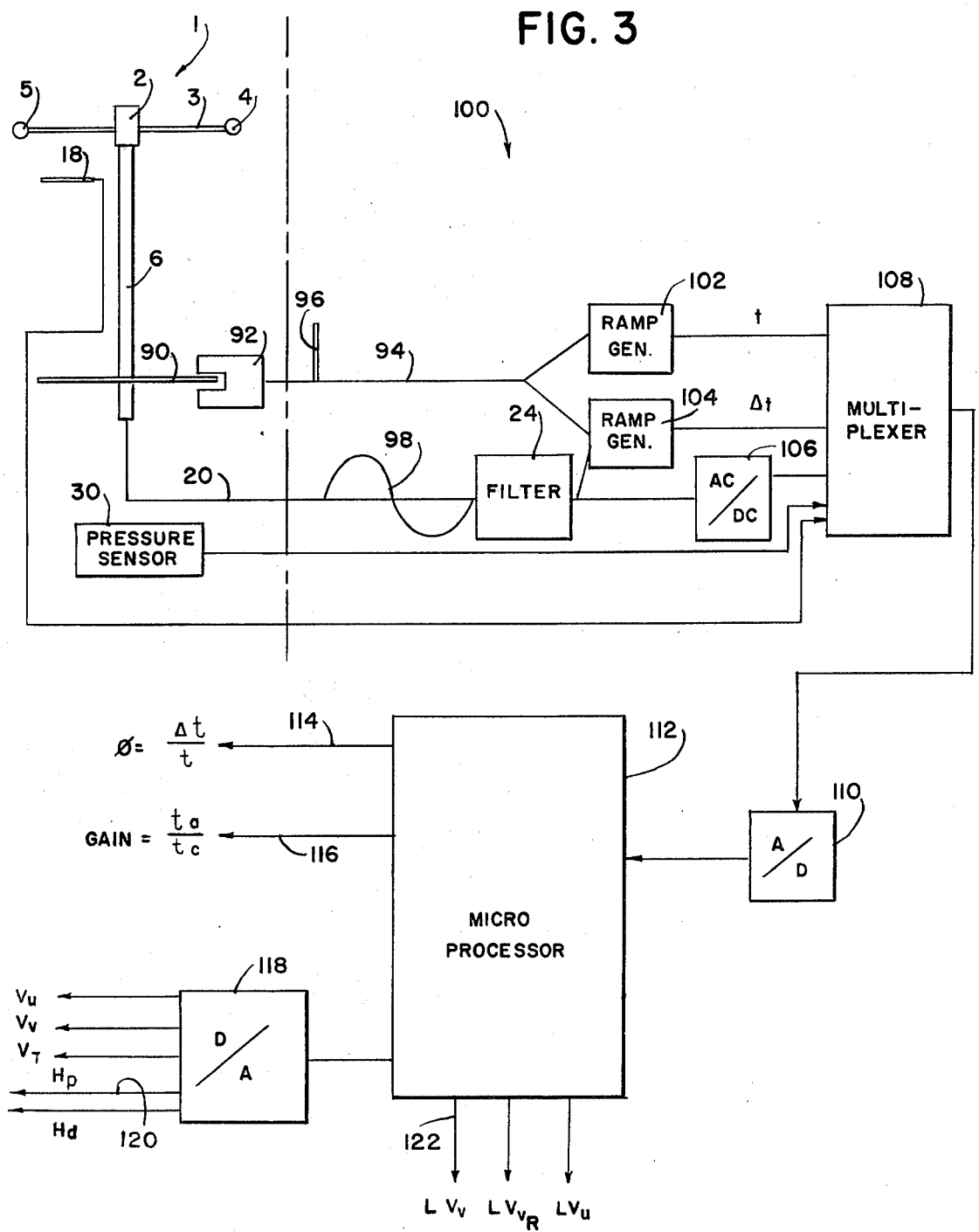
FIG. 3 shows an intermediate embodiment of the present invention.

In FIG. 1 and FIG. 3 the phantom lines divide the sensor components 1 from the air data processor components which are generally referred to by the numeral 46 in FIG. 1 and 100 in FIG. 3.

Referring to FIG. 3, one embodiment of the present invention is shown as having an interrupter disc connected to shaft 6, and an optoelectric sensor 92 which converts the interruptions of the disc to pulses. In a preferred embodiment one pulse 96 per revolution of the disc is output on line 94 by sensor 92. 98 represents the sinusoidal wave form of a signal from the differential pressure sensor in head 2 as supplied to line 20. Filter 24 removes noise from the wave form signal.

The phase reference pulse 96 on line 94 is input to two ramp generators 102 and 104, which develop two voltage levels. Ramp generator 102 is started and stopped by successive pulses, and the ramp voltage generated is an indication of the RPM of shaft 6.

Azimuth reference ramp generator 104 is started by each pulse 96 and ramp voltage is generated until a zero crossing of the wave form 98 stops ramp generator 104. The voltage generated by ramp generator 104 is a function of the time differential between the timing pulse 96 and the crossing of the zero point by wave form 98. The time and time differential signals from ramp generators 102 and 104 and the filtered pressure differential signal from AC to DC converter 106 are fed to multiplexer 108 along with the DC signals from the pressure sensor 30 and the temperature sensor 18. An analog to digital converter feeds the signals to microprocessor 112, which then operates on the signals as later will be described, to produce the outputs related to phase angle $(\phi) - \Delta t/t$ on line 114, gain Ta/Tc on line 116, and through a set of digital to analog converters, shown schematically in FIG. 3 by element 118, outputs of lateral speed $V_u$, longitudinal speed $V_y$ and total speed $V_t$, as well as pressure altitude $H_p$ and density altitude $H_d$ on lines 120. In addition, the microprocessor outputs the limits of speed in the forward and reverse directions $LV_V LV_{VR}$ and in the lateral directions $LV_U$ on output lines 122.

Figure 2:
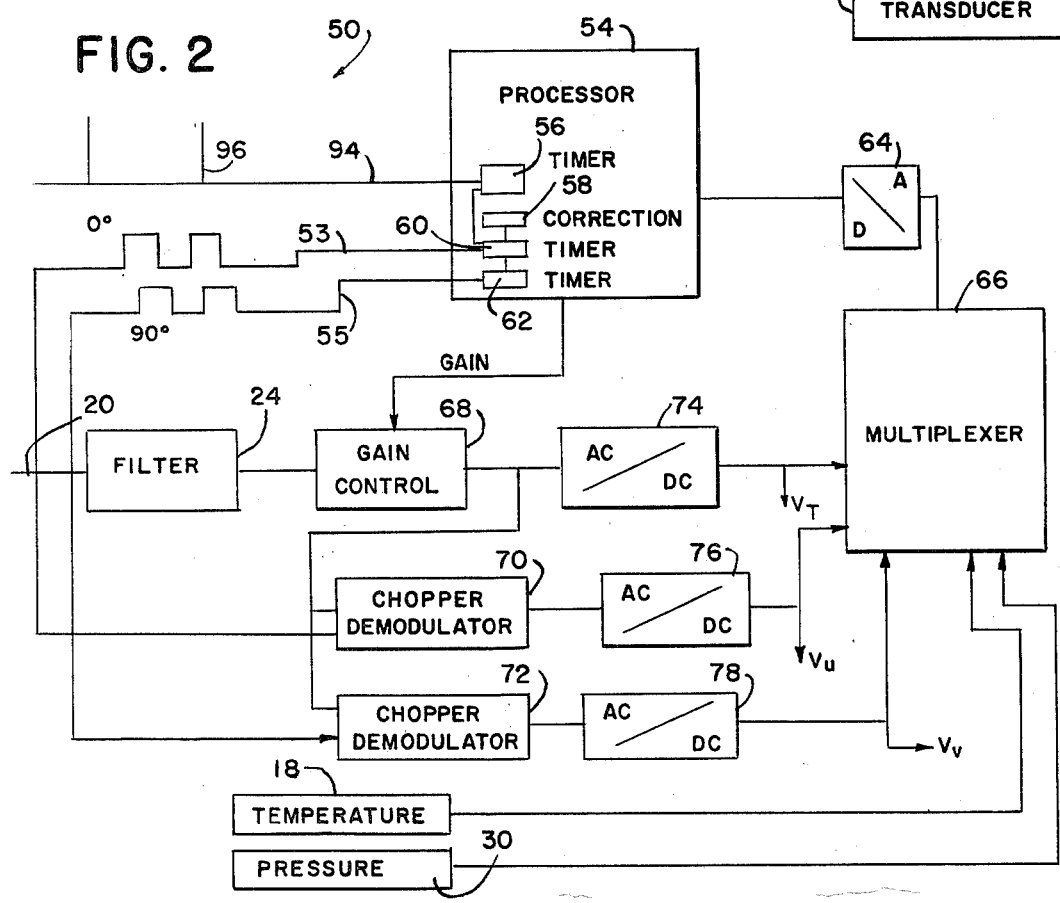
FIG. 2 shows a preferred embodiment of the invention.

In a preferred form of the invention as shown in FIG. 2, the air data processor apparatus is generally indicated by the numeral 50. Pulses 96 from the optoelectric sensor are fed on line 94 to processor 54, and specifically to a conventional timer 56 within the processor. Correction circuits 58 correct systematic errors, position errors and air density, from temperature and pressure inputs. Conventional timers 60 and 62 output square wave signals at zero degrees and 90 degrees phase shift with respect to the pulse 96 on lines 53 and 55, respectively. Processor 54 is supplied via analog to digital converter 64 with signals from multiplexer 66. The sinusoidal pressure differential signal on line 20 is filtered with band pass filter 24 and is amplified by gain control 68, with gain supplied from processor 54.

Chopper demodulator 70, as controlled by the square wave on line 53, demodulates the output signal from gain control 68 and produces a signal proportional to the lateral speed $V_u$.

Chopper demodulator 72, as controlled by the ninety degree offset square wave on line 55, demodulates the signal from gain control 68 to an AC signal which is related to the axial speed $V_\nu$.

AC to DC converters 74, 76 and 78 supply DC signals related to $V_t$, $V_u$ and $V_v$ to multiplexer 66. Multiplexer 66 also receives signals from temperature sensor 18 and pressure sensor 30.

Processor 54 outputs signals similar to processor 112, with the exception that the air speed component signals may be directly read from the AC to DC converters 74, 76 and 78.

While the invention has been described with reference to specific embodiments, it will be obvious to those skilled in the art that variations and modifications of the invention may be constructed without departing from the scope of the invention.

The scope of the invention is defined in the following claims.

We claim:

1. An omnidirectional air speed system comprising a mast, a shaft mounted for rotation within the mast, an arm connected to the shaft and extending radially therefrom for rotating with the shaft, means for rotating the shaft, pressure samplers on opposite ends of the shaft, a pressure differential sensor connected to the pressure samplers for producing a signal related to differential pressure, a disc mounted on the shaft having at least one irregularity and irregularity sensing means mounted adjacent the disc for sensing the irregularity, means connected to the irregularity sensing means and to the pressure differential sensor for producing indications of speed vectors and sums.

2. The omnidirectional air speed system of claim 1 wherein the irregularity in the disc comprises an opening in the disc and wherein the irregularity sensing means comprises a beam producing means for projecting a beam through the opening and a beam receiving means for receiving a beam through the opening.

3. The omnidirectional air speed system of claim 2 wherein the beam producing means comprises a light producing means and wherein the beam receiving means comprises a photocell means for receiving the beam and further comprising pulse producing means connected to the photocell for producing a pulse upon the photocell receiving the beam.

4. The omnidirectional air speed system of claim 3 wherein the means for producing indications of speed vectors and sums comprises first and second ramp generators connected to the pulse producing means, the first ramp generator producing uniform ramps which are terminated upon occurrence of a pulse from the pulse producing means and further comprising filter means connected to the pressure differential sensor for filtering a signal from the pressure differential sensor and wherein the second ramp generating means is connected to the filter means for receiving a filtered signal whereby the second ramp generator produces a signal related to timing of the pulse and timing of the filtered signal, AC to DC conversion means connected to the filter means for receiving the filtered signal and converting the filtered signal to a DC signal, multiplexer means connected to the first ramp generator for receiving a timing signal, connected to the second ramp generator for receiving a time differential signal and connected to the AC to DC converter for receiving a magnitude signal, analog to digital converter means connected to the multiplexer for converting analog signals from the multiplexer to digital signals, microprocessor means connected to the analog to digital converter for processing signals from the multiplexer and output means connected to the microprocessor means.

5. The omnidirectional air speed system of claim 4 wherein the output means comprises digital to analog converter means and outputs of speed vectors and sums.

6. The omnidirectional air speed system of claim 5 wherein the output means further comprises outputs of pressure altitude and density altitude from the digital to analog converter means.

7. The omnidirectional air speed system of claim 5 wherein the microprocessor further has outputs of Δ time/time, which equals phase angle and actual time versus constant time which equals gain.

8. The omnidirectional air speed system of claim 5 wherein the microprocessor further has outputs of limits of speed in the forward, reverse and lateral directions.

9. The omnidirectional air speed system of claim 1 wherein the irregularity sensing means is connected to processor means which includes correction means and timer means to produce signals at zero degrees and ninety degrees intervals, wherein the processor means has an output of gain and further comprising a gain control connected to the filter for receiving the filtered signal and operating on the filtered signal according to the gain signal to produce a gain-controlled filtered signal and wherein the gain-controlled filter signal is fed to first and second chopper demodulators, the first chopper demodulator producing a signal related to lateral velocity, the second chopper demodulator receiving the ninety degree signal and producing a signal related to longitudinal velocity and further comprising AC to DC converter means connected to the gain control and to the first and second chopper demodulators for inputting gain-controlled signals and chopper demodulated signals of lateral velocity and longitudinal velocity to the multiplexer.

10. An omnidirectional air speed system having rotating hollow arms and a differential pressure sensor at inward ends of the hollow arms and communication means for communicating a sinusoidal signal representative of varying differential pressure between the rotating arms and having a temperature sensor and an ambient pressure sensor, the improvement comprising a phase reference indicating means connected to the arms for producing pulses indicating a predetermined angular position of the arms and an air data processor means connected to the phase reference indicating means, to the sinusoidal wave communicating means and to the temperature and pressure means for producing signals proportional to error data including total air speed, axial air speed and lateral air speed.

11. The omnidirectional air speed system of claim 10 wherein the phase reference indicating means produces one pulse per rotation of the arms.

12. The omnidirectional air speed system of claim 10 further comprising first timer means connected to the phase reference indicating means and second and third timer means connected to the first timer means, the second timer means producing a square wave in phase with the pulse and the third timer means producing a square wave ninety degrees out of phase with the pulse, first and second chopper demodulator means individually connected to the communication means for receiving the sinusoidal wave from the differential pressure sensor, the first chopper demodulator being connected to the second timer and the second chopper demodulator being connected to the third timer for demodulating the sinusoidal wave respectively according to the in phase square wave and the out of phase square wave, whereby the first chopper demodulator produces a signal related to lateral speed and whereby the second chopper demodulator produces a signal related to longitudinal speed.

13. The omnidirectional air speed system of claim 12 further comprising plural AC to DC converters severally connected to the communication means and to the first and second chopper demodulators for respectively producing DC signals related to total air speed, to lateral air speed and to longitudinal air speed.

14. The omnidirectional air speed system of claim 13 further comprising a temperature sensor and an ambient pressure sensor respectively connected to a multiplexer, the multiplexer being connected to the AC to DC converters, an analog to digital converter connected to the multiplexer, and a processor connected to the analog to digital converter.

15. The omnidirectional air speed system of claim 14 wherein the processor includes a correction circuit and wherein the correction circuit includes means for incorporating systematic errors, position errors and errors due to air density, temperature and pressure and for producing a correction signal therefrom and further comprising a gain control means in the communication means for communicating a sinusoidal signal, wherein output of the gain control means is fed to the first and second chopper demodulators and to the multiplexer via one of the AC to DC converters.

16. The omnidirectional air speed system of claim 10 further comprising first and second ramp generators connected to the phase reference indicating means, the first ramp generator turning on upon one pulse and turning off upon a subsequent pulse whereby voltage produced by the ramp generator is related to time between pulses and rotational speed of the rotating arms, the second ramp generator being connected to the communication means for receiving the sinusoidal signal and the second ramp generator changing state upon a pulse and again changing state upon the sinusoidal signal passing through zero whereby the second ramp generator produces a voltage which is related to the difference in time between the pulse and the sinusoidal wave passing through zero, AC to DC converter means connected to the communicating means for producing a DC signal related to the sinusoidal signal and related to total air speed, $V_T$.

17. The omnidirectional air speed system of claim 16 further comprising a multiplexer connected to the AC to DC converter and to the first and second ramp generator, an analog to digital converter connected to the multiplexer and a microprocessor connected to the analog to digital converter.

18. The omnidirectional air speed system of claim 17 wherein the microprocessor has a digital to analog converter means and wherein the digital to analog converter means outputs lateral velocity, $V_u$, longitudinal velocity, $V_v$, and total velocity $V_T$.

19. The omnidirectional air speed system of claim 18 further comprising a pressure sensor having a signal means connected to the multiplexer and a temperature sensor having a signal means connected to the multiplexer and wherein the digital to analog converter further outputs pressure altitude $H_p$ and density altitude $H_d$.

20. The omnidirectional air speed system of claim 13 wherein the microprocessor further outputs phase angle and gain and limits of longitudinal speed $V_v$, lateral speed $V_u$ and longitudinal reverse speed $V_{vr}$.

* * * * *